Patented Jan. 27, 1931

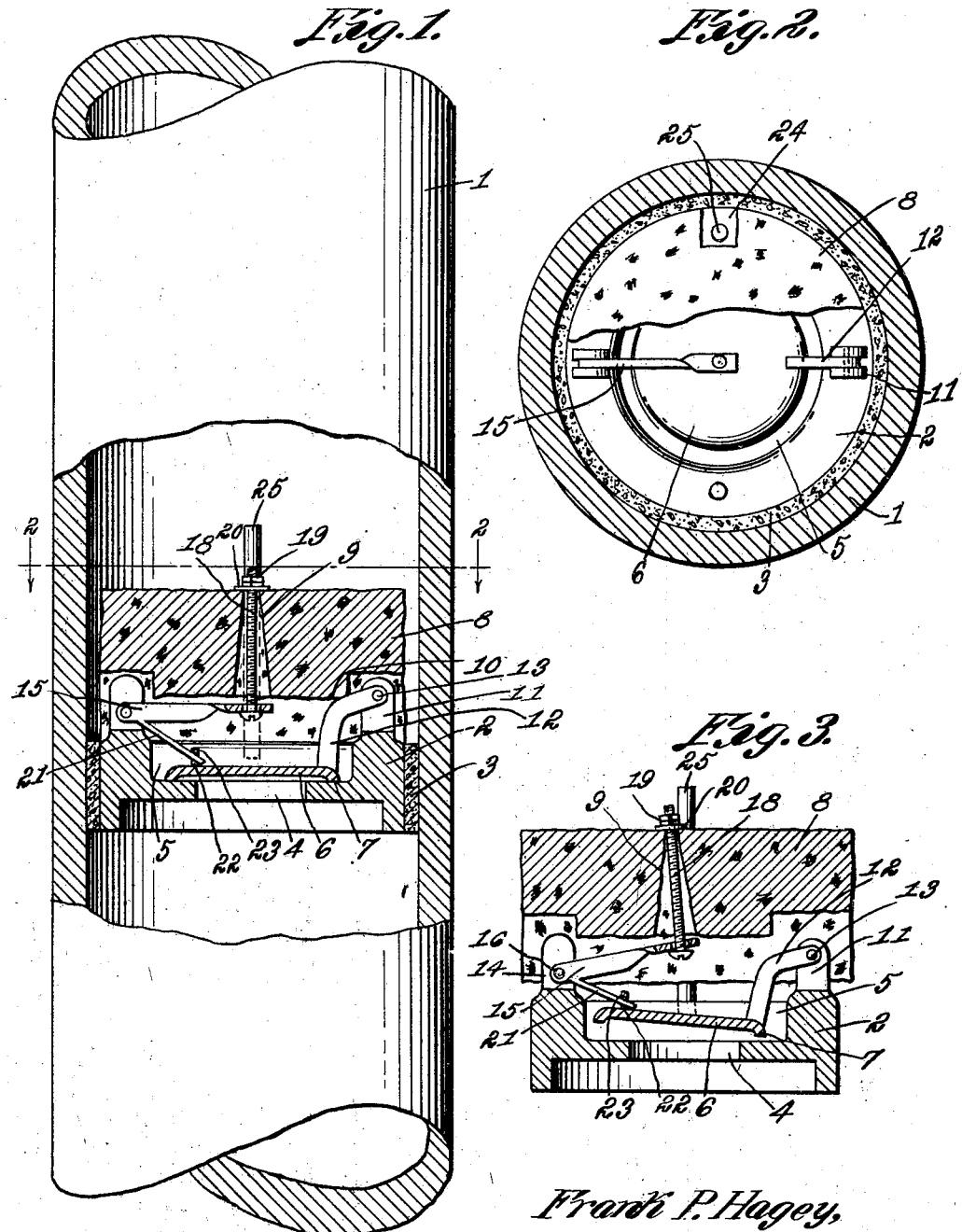

1,790,541

UNITED STATES PATENT OFFICE

FRANK P. HAGEY AND JONAS A. KRETZER, OF OMAHA, NEBRASKA

AUTOMATIC VALVE

Application filed November 8, 1929. Serial No. 405,726.

This invention relates to improvements in automatic valves and more particularly to an improved valve of the type which is to be employed in connection with sewer drain pipes. In such drain pipes no valve is sometimes employed for preventing the discharge of foul odors from the sewer pipe, and on the other hand, such valves as have heretofore been employed in this connection have proved unsatisfactory. Therefore, the present invention has as its primary object to provide a valve which may be installed in connection with sewer drain pipes and particularly in the construction of urinals in hotels and other public buildings, and which valve will automatically open through the rise of a float associated therewith and will automatically close upon lowering of the float so as to effectively seal the upper end of the drain pipe and thus prevent the escape of odors therefrom.

Another object of the invention is to provide a valve of this type so constructed that it may be manufactured in various sizes depending upon the diameter of the sewer drain pipe in which it is to be installed, or the character of the plumbing in connection with which it is used, without any material alterations of the structure of any of its component parts or any rearrangement of the same.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a view partly in vertical section and partly in side elevation illustrating the valve embodying the invention installed in a sewer drain pipe, the valve being in closed position.

Figure 2 is a horizontal sectional view taken substantially on the line 2—2 of Figure 1, looking in the direction indicated by the arrows.

Figure 3 is a detailed view in section of the valve and similar to Figure 1 but showing the valve in open position.

In the drawing the numeral 1 indicates the sewer drain pipe and the numeral 2 indicates the valve seat which is of circular form and the outer side of which is therefore cylindrical and of a diameter less than the internal diameter of the pipe 1, so that a seal 3 of cement may be provided between the periphery of the seat 2 and the inner surface of the wall of the pipe. The seat 2 will of course be positioned at any desired point in the drain pipe, its location being a matter of discretion. The said seat 2 is formed centrally with the opening 4, and the web portion of the seat in which this opening is formed constitutes the bottom of a recess 5 of circular form, which is formed in the upper side of the seat, and the purpose of locating the opening 4 below the upper side of the valve seat body will presently be explained.

The valve proper is indicated by the numeral 6, and will preferably be of non-corrosive metal, and the valve is of circular form and preferably of shallow concave contour at its outer side so that there is a downwardly projecting peripheral portion 7, which is designed to rest evenly upon the upper surface of the bottom of the recess 5, the valve and its seating portion 7 being so proportioned that the seating portion will be of a diameter greater than the diameter of the opening 4 in the seat. The invention contemplates an automatic opening of the valve through the medium of a float, and this float and the parts associated therewith and with the valve 6 will now be described.

The float, indicated by the numeral 8, comprises a substantially cylindrical body which is of cork and which is formed centrally with an opening 9 of substantially upwardly tapered and conical form. The under side of the float 8 is formed, near its periphery, to snugly seat upon the upper edge of the wall of the valve seat 2, and a suitable recess 10 is formed in the under side of the float to accommodate the parts which are connected with the valve and with the float, and which provide for actuation of the valve in the rise and fall of the float. A pair of ears 11 is formed upon the upper side of the seat 2, at one side of the recess 5 therein, and an upwardly laterally turned arm 12 is formed upon the upper side of the valve 6 and at the margin thereof. Its upper end is pivoted as at 13 between the said ears 11 so that the valve may be moved about the pivot 13 to assume a closed position as shown in Figure 1 or the open position shown in Figure 3. A similar pair of gears 14 are formed at the diametrically opposite side of the valve seat 2, and an arm 15 is pivoted at one end as at 16 between the ears and is extended upwardly inwardly within the recess 10 in the float body and provided with an opening in its inner end indicated by the numeral 17, in which opening is engaged the lower end of a stem 18, this stem extending freely upwardly through the opening 9 in the float body and a nut 19 being threaded onto the upper end of the stem and bearing against a washer 20 upon its said end which washer rests upon the upper side of the float body at the upper end of the opening 9. The numeral 21 indicates a finger which projects downwards from the lower edge of the arm 15 at a slight angle of inclination with respect thereto and likewise with respect to the axis of the valve seat, and the free end of this finger projects into an opening 22 which is formed in an ear 23, formed or provided upon the upper side of the valve 6 at a point diametrically opposite the point of connection of the arm 12 with the said valve.

From the foregoing it will be evident that when there is no liquid in the pipe 1 except a small residual quantity which may have remained upon the surface of the bottom of the recess 5 and forming an air tight water seal for the valve, in its closed position, the valve and float will assume the positions shown in the said Figure 1, the valve resting in closed position upon its seat and the float 8 resting upon the upper portion of the valve seat. The buoyancy of the float 8 will cause it to rise upon the entry of any liquid into the pipe 1 and as it rises a rocking motion is imparted to the arm 15 thus causing the finger 21 to likewise swing upwardly and hold the valve 6 in the open position shown in Figure 3. As soon as all the liquid has drained from the pipe except for the small residual quantity referred to above the float will of course lower and thus will effect downward movement of the valve to its closed position and, due to the fact that the valve will remain in this position and that the air tight seal is provided between the valve and its seat, there will be no delivery of the foul odors from the drain pipe.

In order that the float 8 may be restrained against any rotative displacement, it is formed at its outer surface at diametrically opposite points with recesses 24, and stems 25 are secured at their lower ends in or to the valve seat 2 and extend upwardly therefrom and each within a respective one of said recesses.

What we claim is:—

1. In a valve for drain pipes, a valve seat having a fluid passage therein, a float above the valve seat normally resting upon a portion thereof, a valve pivotally connected with the valve seat and normally assuming a position resting upon the seat and closing the fluid passage, and means connecting the valve and float for effecting movement of the valve to open position upon rise of the float, the said means comprising an angle lever having one arm connected with the float and its other arm pivotally engaged with the valve.

2. In a valve for drain pipes, a valve seat having a fluid passage therein and a raised portion surrounding said passage whereby to provide a space above the passage, a float resting at the marginal portion of its under side upon the raised portion of the valve seat, a valve pivotally mounted upon the valve seat and normally resting upon the seat in a recess, therein closing the fluid passage, and means connecting the valve and float for effecting movement of the valve to open position upon rise of the float.

3. In a valve for drain pipes, a valve seat having a fluid passage therein, a float above the valve seat normally resting upon a portion thereof, a valve pivotally connected with the valve seat and normally assuming a position resting upon the seat and closing the fluid passage, means connecting the valve and float for effecting movement of the valve to open position upon rise of the float, the float having a substantially conical opening located centrally therein, a stem suspended within said opening and an angular lever mounted for rocking movement upon the valve seat and having one arm pivotally engaged with the lower end of said stem, the other arm of the angle lever being pivotally connected with the valve.

4. In a valve for drain pipes, a valve seat having a fluid passage therein, a float above the valve seat normally resting upon a portion thereof, means for guiding the said float in its up and down motion comprising stems extending upwardly from opposite sides of the valve seat, the said float being provided with vertically extending recesses in its outer surface to accommodate said stems, a valve pivotally connected with the valve seat and normally assuming a position resting upon the seat and closing the fluid passage, and means connecting the valve and float for effecting movement of the valve to open position upon rise of the float.

In testimony whereof we have affixed our signatures.

FRANK P. HAGEY.
JONAS A. KRETZER.